(12) United States Patent
Baumer et al.

(10) Patent No.: US 6,232,917 B1
(45) Date of Patent: May 15, 2001

(54) NAVIGATIONAL SYSTEM

(75) Inventors: Jean-Claude Baumer, Cagnes sur Mer Cedex; Jean-Claude Giacalone, Vence, both of (FR); Hans-Martin Hilbig, Tiefenbach (DE)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/196,895

(22) Filed: Nov. 19, 1998

(51) Int. Cl.[7] .............................. G01S 5/02; G01S 3/02; H04B 7/185; G01C 21/00; G06G 7/78
(52) U.S. Cl. ................... 342/357.13; 342/452; 701/201; 701/206; 701/208; 701/210; 701/209; 701/211; 340/995
(58) Field of Search .............................. 342/357.13, 452; 701/201, 206, 208, 209, 210, 211; 340/995

(56) References Cited

U.S. PATENT DOCUMENTS

| | | | |
|---|---|---|---|
| 5,543,789 | * | 8/1996 | Behr et al. ........................... 340/995 |
| 5,610,821 | | 3/1997 | Gazis et al. . |

FOREIGN PATENT DOCUMENTS

| | | |
|---|---|---|
| 195 21 929 | 4/1996 | (DE) . |
| 196 21 225 | 12/1996 | (DE) . |
| 195 39 641 | 4/1997 | (DE) . |
| WO 96 00373 | 1/1996 | (WO) . |

* cited by examiner

*Primary Examiner*—Thomas H. Tarcza
*Assistant Examiner*—Fred Mull
(74) *Attorney, Agent, or Firm*—William B. Kempler; Frederick J. Telecky, Jr.

(57) ABSTRACT

The navigational system, device and method of the present invention provide navigational information to the user derived from data signals received from a plurality of transmitters (20,22,24,26). The range to each of the plurality of transmitters (20,22,24,26) is then computed based upon the corresponding data signal received from the transmitters, and a current position relative to each of said plurality of transmitters is then determined. Geographical data relating to at least the current location of the user module 32 is stored in a memory 40, and selected geographical data relating to the current location of the user module 32 is retrieved from the memory 40 to provide an audio or video display 44. The computed route between the current position of the user module 32 and each of a plurality of way-points is then transmitted to a control processor which compares the determined route with routes received from other user modules and predicts traffic conditions for transmission back to the user module so that the route may be altered accordingly.

32 Claims, 3 Drawing Sheets

NAVIGATIONAL SYSTEM

FIELD OF THE INVENTION

The present invention relates to the field of navigational systems, and more particularly to a system, device and method of operation that provides the user with current information on the immediate environment and a route to a selected destination.

BACKGROUND OF THE INVENTION

Systems for providing positional and navigational information are known in the art. Typically, these systems utilise signals derived from a Global Positioning System (GPS) such as the NAVSTAR system.

Navstar was developed to provide accurate position, velocity, and time information in any environmental conditions. The system includes twenty-four satellites arranged in six orbital planes such that the satellites orbit the planet in circular orbits with a twelve hour period. The satellite orbits are arranged such that at least four satellites are in "view" (i.e. not obscured by the curvature of the planet) from any position on the planet.

Each user module receives periodically transmitted signals from four satellites. The user unit computes a range to each satellite based upon the known time of receipt of the signal, and a predicted time of transmission of the signal from the satellite. GPS systems commonly have two standards of operation; a military standard and a civilian standard. Systems operating according to the military standard provide a positional accuracy of 16 meters, a velocity accuracy of 0.1 meters per second, and a time accuracy to 100 nanoseconds. However, the signals transmitted by the satellites according to the military standard are encrypted to prevent unauthorised access. Comparably, systems operating according to the civilian standard provide a positional accuracy of 100 meters.

Vehicle navigational systems are well known in the art. For example, European Patent Application No. EP-A-0,542,331 discloses a vehicle navigational device for directing a vehicle along a predetermined route. The device utilises GPS positional data displayed on a display unit within the vehicle The "Route Planner" system manufactured by TECmobility™ a subsidiary of Magneti Marelli is a navigational device that provides positional information of a vehicle relative to a map, together with a route planning capability. The position of the vehicle is estimated using positional data from signals received from GPS satellites. The actual position of the vehicle is then corrected by algorithms that relate the positional data computed from received GPS signals to a corresponding position on map of the current location of the vehicle stored on a CD-ROM.

The route planning function calculates the best route between the current vehicle location and a user selected destination. The system is capable of recalculating the route should the user deviate from the predetermined route due to adverse traffic conditions etc. The system is further capable of receiving data relating to the conditions on the predetermined route, and recalculating the route in accordance with the received traffic conditions etc.

However, although the system is capable of receiving data for causing the recalculation of the predetermined route due to adverse traffic conditions, the system is not capable of proactively recalculating the route due to the planned route calculations of other users of the system. For example, a user may be provided with a predetermined route which takes account of the current traffic conditions, but the system takes no account of the predicted travel conditions on the route within the travel period of the user. Consequently, although the selected route may be determined in accordance with the traffic conditions at the time of route determination, the predetermined route may be less appropriate when considering the intentions of other road users.

SUMMARY OF THE INVENTION

The present invention provides a system, device, and method for providing navigational information to a user that is calculated in accordance with known current travel conditions. The navigational information provided to the user is further calculated in response to the predicted travel conditions during the period when the user will be present at a way-point on the route between the initial position and the destination. The navigational information is interpreted in the context of local environmental information.

Therefore, according to a first aspect of the present invention there is provided A navigational system comprising; a plurality of transmitters for transmitting a clocking signal to a user module; the user module including; a processor for computing the range to each of the plurality of transmitters based upon the corresponding clocking signals received therefrom, and for determining a current position relative to each of said plurality of transmitters; designation means for sequentially designating and storing a sequence of reference points defining said current position relative to an initial position and a selected final position; a memory for storing geographical data relating to at least the current position of the user module; selection means for selecting geographical data relating to the current location of the user module based upon the determined current position; a display for providing an audio or video display of the selected geographical data and the current location of the user module relative thereto, and for providing an indication to the user of the distance and direction to a subsequent reference point in said sequence; and transmission means for transmitting said designated sequence of reference points to a control processor associated with at least one of said plurality of transmitters.

The data signals transmitted by the transmission means preferably comprise a geographical data component providing information on the current environment, and a positional data component the processor with information necessary to determine the instantaneous position of the receiver. For example, the geographical data may comprise a map of the current location or details of places of interest.

Preferably, the user module polls one of the transceivers, and receives geographical data relevant to the instantaneous environment of the receiver from the transceiver in response to being polled. The received geographical data is then stored in the memory.

Preferably geographical data can be provided to the memory for storage by coupling the user module to an external device. The external device may comprise a computer linked to a database via a network or modem, or comprise a CD-ROM, floppy disk or other suitable data storage medium.

The user is provided with a keyboard or other suitable data entry device for selecting a route between the current location and a destination location. A first reference point is assigned to the current location and a second reference point is assigned to the destination location. Further locations between said current location and said destination location may be selected and are assigned reference points accordingly.

According to a second aspect of the present invention there is provided a user module for a navigational system comprising; a receiver for receiving clocking signals from a plurality of transmitters; a processor for computing the range to each of the plurality of transmitters based upon the corresponding clocking signals received therefrom, and for determining a current position relative to each of said plurality of transmitters; designation means for sequentially designating and storing a sequence of reference points defining said current position relative to an initial position and a selected final position; a memory for storing geographical data relating to at least the current position of the user module; selection means for selecting geographical data relating to the current location of the user module based upon the determined current position; a display for providing an audio or video display of the selected geographical data and the current location of the user module relative thereto, and for providing an indication to the user of the distance and direction to a subsequent reference point in said sequence; and transmission means for transmitting said designated sequence of reference points to a control processor associated with at least one of said plurality of transmitters.

Preferably, the user module is hand-held or comprises a head-up display. Alternatively the user module may comprise a portable computing device. The display generally comprises an image of the current environment and a display of a navigational indication element.

According to a third aspect of the present invention there is provided a method of providing navigational information comprising; receiving data signals from a plurality of transmitters; computing the range to each of the plurality of transmitters based upon a clocking signal received therefrom, and for determining a current position relative to each of said plurality of transmitters; designating a sequence of reference points defining said current position relative to an initial position and a selected final position; storing geographical data relating to at least the current location in a memory; selecting geographical data relating to the current location from said memory; providing an audio or video display of the selected geographical data and the current position of the user relative thereto, and providing an indication to the user of the distance and direction to a subsequent reference point; and transmitting said designated sequence of reference points to a control processor associated with at least one of said plurality of transmitters.

BRIEF DESCRIPTION OF THE DRAWINGS

The present invention will now be further described, by way of example, with reference to the accompanying drawings in which.

For convenience like and corresponding features of the accompanying drawings have been assigned corresponding reference numerals.

DETAILED DESCRIPTION OF THE DRAWINGS

Figure 1:
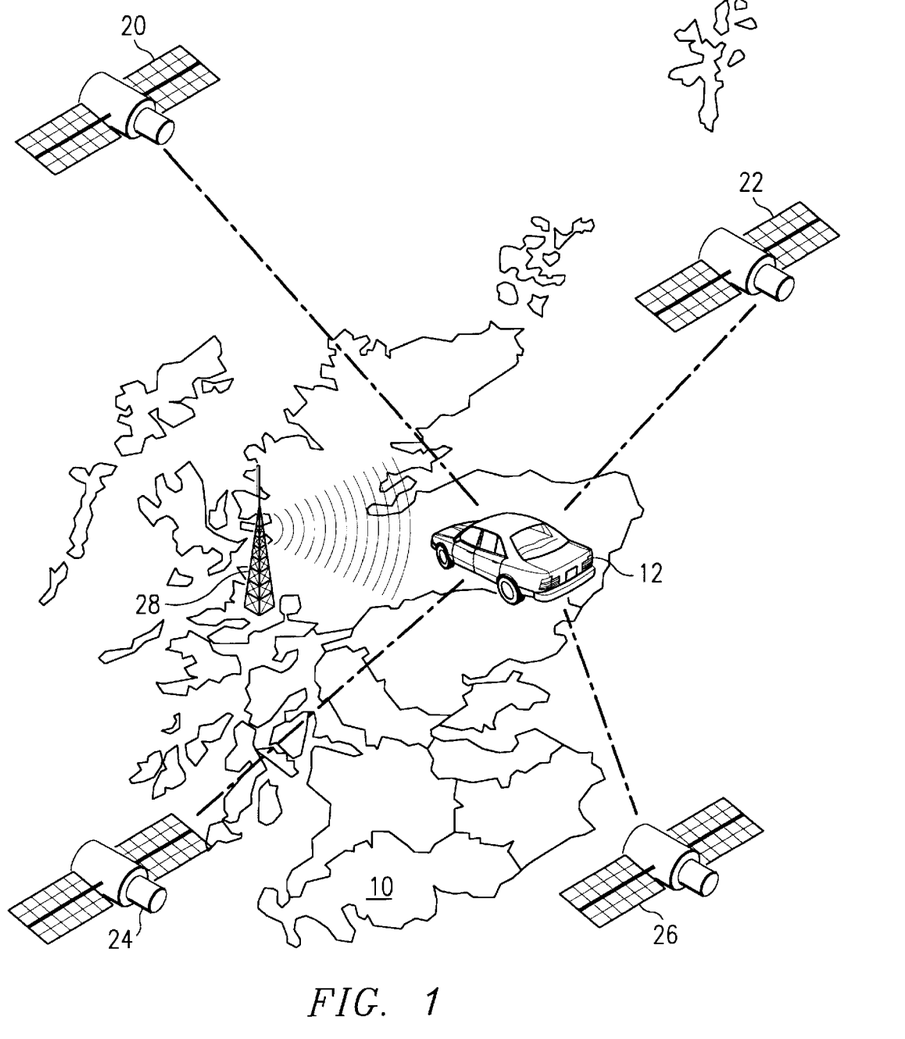
FIG. 1 shows a schematic illustration of a navigational system according to the present invention.
Figure 2:
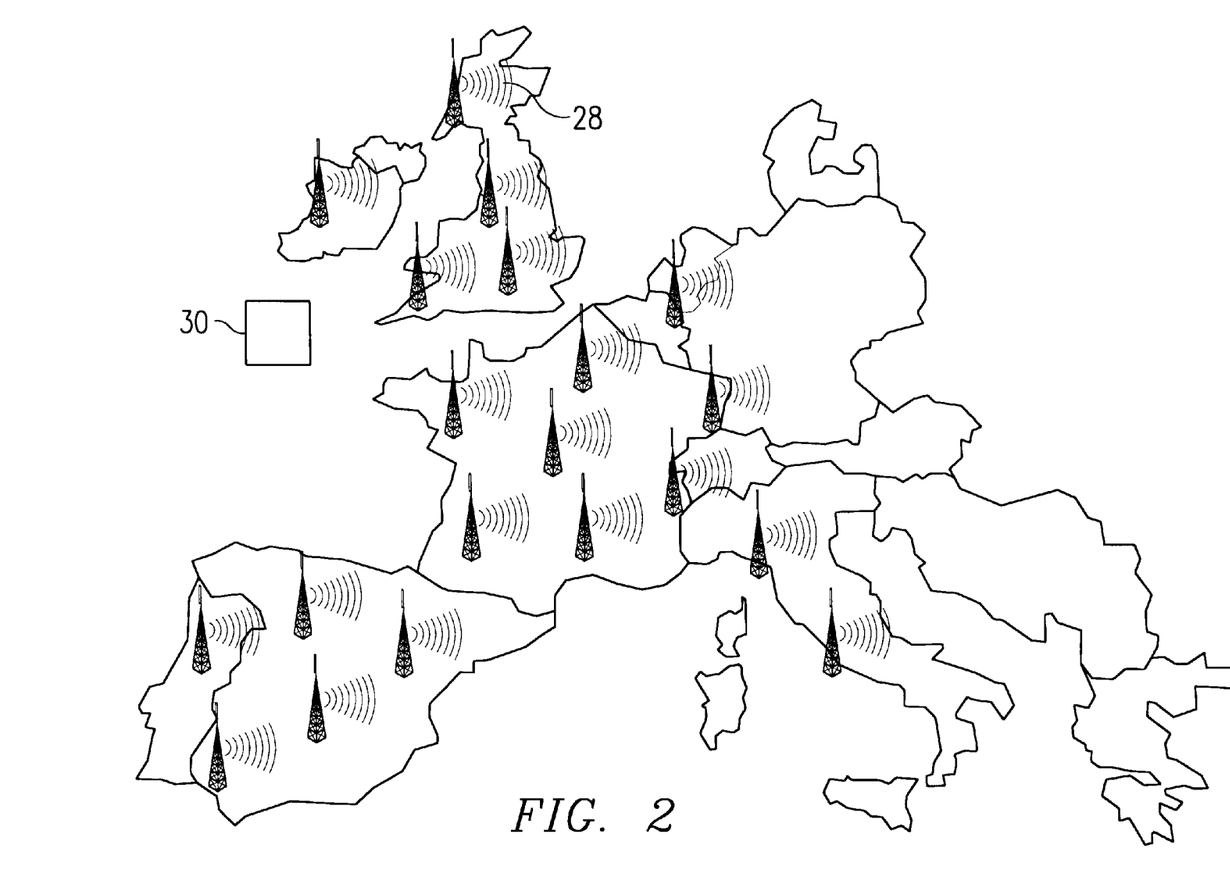
FIG. 2 shows a schematic illustration of the navigational system of FIG. 1.

Referring to FIGS. 1 and 2, there are shown schematic illustrations of a particularly preferred embodiment of the system of the present invention. A region 10 is shown within which a user module 32 mounted, for example, on a motor vehicle 12 may receive signals from at least four satellites (20,22,24,26) of a GPS system.

There is also illustrated a transceiver 28 for transmitting and receiving data signals to and from a plurality of similar user modules 32 mounted on vehicles 12. Each transceiver 28 is capable of data communication with a control processor 30 associated with the region 10.

Preferably the control processor 30 is in the form of a database that contains information pertaining to the environment of one or more regions 10. For example, the database may include data relating to towns and villages, to the type of roads, to stores in the towns and villages, to geographical or historical information, and to police stations or hospitals.

Preferably, the control processor 30 associated with each region 10 will be capable of data communication with corresponding control processors 30 associated with other regions 10 utilising the navigational system of the invention.

Figure 3:
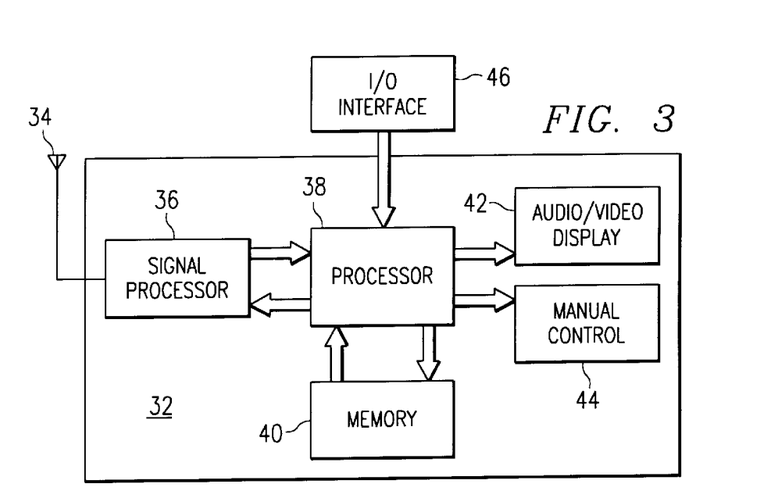
FIG. 3 shows a schematic block illustration of a user module for operation with the navigational system of FIG. 1.

Referring now to FIG. 3, there is illustrated a schematic illustration of a user module 32 for use with the system 10 of the invention. The user module 32 includes an antennae 34, signal processor 36, microprocessor 38, memory 40, audio/video display 42, manual control unit 44, and Input/Output (I/O) interface 46. The signal processor 36 and microprocessor 38 may be provided in the form of a unitary device such as a digital signal processor. For example, a suitable digital signal processor would be TMS320C6X manufactured by Texas Instruments Inc.

Operation of the system for determining the position of the vehicle 12 will now be described with reference to FIGS. 1, 2 and 3.

Figure 2A:
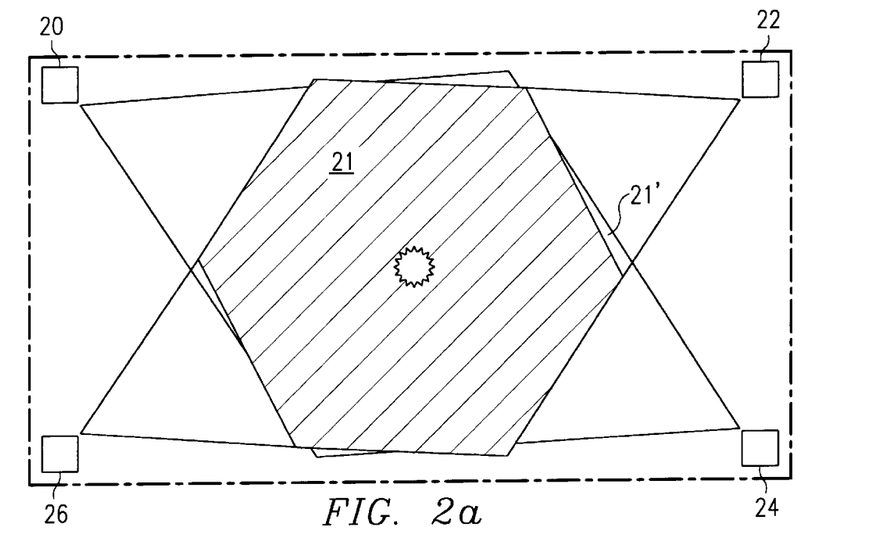
FIG. 2a shows a schematic illustration of the coverage of a region by satellites used with the navigational system of FIGS. 1 and 2.

Each satellite (20,22,24,26) periodically transmits a clocking signal ($CLK_1$–$CLK_4$) which is received by the antennae 34 of user module 32 mounted on the vehicle 12 if the user module 32 is within the transmission window of the satellite (20,22,24,26). For example, referring briefly to FIG. 2a, a vehicle 12 equipped with a user module 32 located within region 21 is within the transmission window of each of satellites (20,22,24,26) and can receive each of the clocking signals ($CLK_1$–$CLK_4$) associated therewith. However, a vehicle 12 located within region 21' is within the transmission window of two satellites (22,24) and can receive each of the clocking signals ($CLK_2$ and $CLK_3$) associated therewith, but is outside the transmission window of the remaining two satellites (20,26) and cannot receive the clocking signals ($CLK_1$ and $CLK_4$) associated therewith.

Figure 4:
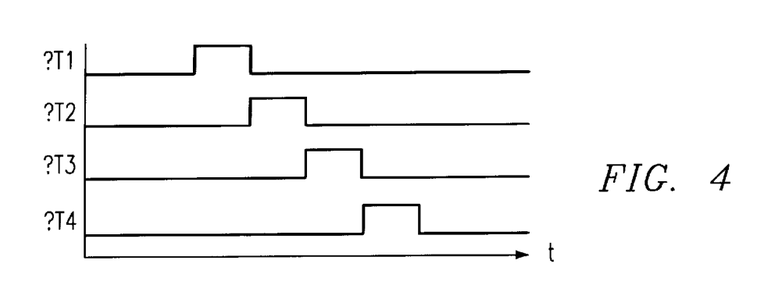
FIG. 4 shows a timing diagram of the navigational system of FIG. 1.

The clocking signals ($CLK_1$–$CLK_4$) are illustrated in FIG. 4. The respective satellites (20,22,24,26) are preferably arranged to transmit the clocking signals ($CLK_1$–$CLK_4$) sequentially so that no two signals are transmitted during the same period.

The processor 38 of the user module 32 calculates the position of the vehicle 12 within the region 10 by calculating the transmission period of each of the four clocking signals ($CLK_1$–$CLK_4$). From the calculation of the transmission period of each clocking signal the microprocessor 38 is able to calculate the position of the vehicle 12 relative to each of the four satellites (20,22,24,26).

The following four equations are constructed and solved to calculate the range to each satellite (20,22,24,26) in two-dimensions;

$$(X_1-U_x)^2+(Y_1-U_y)^2=(R_1-C_H)^2 \quad \text{(i)}$$
$$(X_2-U_x)^2+(Y_2-U_y)^2=(R_2-C_H)^2 \quad \text{(ii)}$$
$$(X_3-U_x)^2+(Y_3-U_y)^2=(R_3-C_H)^2 \quad \text{(iii)}$$
$$(X_4-U_x)^2+(Y_4-U_y)^2=(R_4-C_H)^2 \quad \text{(iv)}$$

where $R_1=C \times \Delta T_1$, $R_2=C \times \Delta T_2$, $R_3=C \times \Delta T_3$, $R_4=C \times \Delta T_4$, and C is the speed of light ($2.997925 \times 10^8$ ms$^{-1}$)

Once the position of the vehicle 12 relative to four satellites (20,22,24,26) has been determined, the microprocessor 38 retrieves data relating to the current environment of the vehicle 12 from the memory 40.

In the particularly preferred embodiment of the invention, data may be downloaded into the memory 40 from a compact disc or other data storage medium via the I/O interface 46. The microprocessor 38 selects only data relating to the current environment of the vehicle 12 for immediate display on the audio/video display 42.

In an initial window generated by the audio/video display 42, the user may select details of the current location of the vehicle 12 (e.g. the street name and/or postcode/zip-code), information relating to the current environment of the vehicle 12 (e.g. nearby facilities such as restaurants, filling stations etc.), or request that a route be computed to a selected destination. The user also may select details of the upcoming traffic conditions based on predictive calculations of control processors 30 from inputs of other user modules 32 from other regions 10.

Each selection is made by actuating manual control 44 which will typically be in the form of a mouse and/or keypad. The processor 38 is responsive to actuation of the manual control 44, and selects data corresponding to a user query entered via actuation of the manual control 44. For example, it is envisaged that a menu be provide which details environmental information relating to facilities within the immediate environment of the vehicle 12. Generic information can also be provided so that the user may select a user query for polling the transceiver 28 for information relating thereto.

For example, the menu may provide generic details of streets within a town or village. A user wishing to select an address will select the menu entry relating to streets. If information relating to the selected menu entry is not available from the data stored in memory 40, a user query is transmitted to the nearest transceiver 28. The transceiver 28 requests that data relating to the user query be provided from the database stored in control processor 30 in response to the request. Consequently, data relating to the user query will be provided to transceiver 28 which will be transmitted to the user module 32.

Initially, data will be provided which provides geographical information, and detailed information of the individual streets for display in a sub-menu. The user may then select a street from the sub-menu and the user module 32 will again poll the transceiver 28 to request information relating to the selected street and its location within the town or region 10.

The processor 38 will then determine the position of the user as discussed previously, and calculate the position of the selected street in relation to the current position of the vehicle 12. The processor 38 then computes a route to the selected street or destination from data stored in memory 40.

If the street or destination is not within the town or region for which data is stored in the memory 40, but is within the associated region 10 in which the vehicle 12 is currently situated, the processor firstly computes a route to the selected town or destination.

Should the control processor 30 be unable to provide information corresponding to the user query, it polls control processors 30 associated with other regions 10 for data relating to the selected destination. If the control processor 30 storing data relating to the selected destination does not correspond to an adjacent region 10, each intermediate control processor 30 is requested to provide data relating to roads through that region 10. Data from each of the control processors 30 is transmitted to the control processor 30 associated with the region 10 in which the vehicle 12 is currently situated.

In computing the route to the town or street, the user module 32 polls the transceiver 28 for information relating to current and predicted road conditions. The transceiver 28 in turn interogates control processor 30 in response to polling thereof.

It is envisaged that the database of the control processor 30 may contain the following information;
(i) details of construction or repair of roads;
(ii) current traffic flow for each portion of the route;
(iii) predicted traffic flow for each portion of the route during each period of the day/week;

For example, the microprocessor 38 is capable of computing a route to the selected destination that avoids road construction/repairs, current traffic holdups, and predicted traffic holdups.

For convenience, intermediate locations between the current location of the vehicle 12 and the destination of the vehicle 12 will be hereinafter referred to as way-points.

The processor 38 computes the route to the selected destination from the data received from the control processors 30 associated with each of the regions 10 through which the vehicle 12 must travel. This route information is then transmitted to the transceiver 28 by user module 32, which in turn provides the route information to the control processor 30. The control processor 30 than compares the route information of the instant vehicle 12, with the route information provided by other vehicles 12 and computes an estimated time-of-arrival (ETA) at each of the way-points for the each of the vehicles 12. The ETA can be determined by calculating the effects of construction or repair of roads, current traffic flow for each portion of the route, predicted traffic flow for each portion of the route during each period of the day/week, and predicted traffic flow due to the route information received from each vehicle 12.

Having calculated the predicted traffic flow during each time period, the control processor 30 forwards the information to the transceiver 28 for transmission to the user module 32 mounted in each vehicle 12. The user module 32 then recomputes the route in light of the information received from the transceiver 28, to determine a set of way-points that define an optimised route to the selected destination. Determination of the route is an iterative process that is continually being performed by the processor 38 in light of the information received from the transceiver 28, the processor 38 continually recomputing the route from the instantaneously current position of the vehicle 12 to the destination via a set of way-points. Therefore, as current and predicted traffic conditions alter at each of the way-points along computed route, the way-points are recomputed to define the optimum route to the selected destination.

Having calculated each of the way-points that define the route, the processor 38 provides directions to the first way-point from the current location of the vehicle 12. Once the first way-point is reached the process of polling and receiving information relating to the instantaneous environment from the vehicle 12 is continuously repeated for determining subsequent way-points. Preferably, the received data/environmental information is in the form of a map of the town or region 10.

As the vehicle 12 travels between the way-points the user module 32 continuously receives and updates the position and/or geographical information that is stored in memory 40 and that is provided to audio/video display 30. Preferably the generated display image shows the position of the user in relation to a map or schematic illustration of the immediate environment.

It is envisaged that, in use, a user may wish to be provided with a route to a selected destination via one or more intermediate locations. The processor 38 is provided with software for determining a route to the destination via a plurality of selected and computed way-points, the route being determined according to the preferences entered by the user actuating manual control 44. For example, a tall vehicle 12 may require a route that avoids low bridges. The user may select a user query using the manual control 44, the user query requesting a route that avoids low bridges. The processor 38 then determines whether any low bridges are present between way-points of the selected route, and selects an alternative route accordingly.

In a preferred embodiment a directional indication to subsequent way-points is provided by the display to direct the user from the initial position via a sequence of intermediate way-points to the destination (i.e. the selected town or street).

Although the invention has been described in terms of a system having transceivers 28 disposed in a region 10, it will be apparent to the skilled person that the invention can be implemented with as few as four satellites (20,22,24,26). The position of the vehicle 12 relative to the satellites (20,22,24,26) may be calculated in terms of longitude, latitude, and altitude co-ordinates and data relating to the immediate environment of the vehicle 12 can be selected from the control processor 30 accordingly.

Additionally, the processor 38 of the user module 32 may be capable of calculating the position of the user within the region 10 by calculating the transmission period of each of the four clocking signals ($CLK_1$–$CLK_4$). From the calculation of the transmission period of each clocking signal the processor 38 is able to calculate the position of the user module relative to each of the four satellites (20,22,24,26). The following four equations are constructed and solved to calculate the range to each satellites (20,22,24,26) in three-dimensions;

$$(X_1-U_x)^2+(Y_1-U_y)^2+(Z_1-U_z)^2=(R_1-C_H)^2 \quad (i)$$

$$(X_2-U_x)^2+(Y_2-U_y)^2+(Z_2-U_z)^2=(R_2-C_H)^2 \quad (ii)$$

$$(X_3-U_x)^2+(Y_3-U_y)^2+(Z_3-U_z)^2=(R_3-C_H)^2 \quad (iii)$$

$$(X_4-U_x)^2+(Y_4-U_y)^2+(Z_4-U_z)^2=(R_4-C_H)^2 \quad (iv)$$

where $R_1=C\times\Delta T_1$, $R_2=C\times\Delta T_2$, $R_3=C\times\Delta T_3$, $R_4=C\times\Delta T_4$, and C is the speed of light ($2.997925\times10^8$ ms$^{-1}$).

It will further be apparent to the skilled person that the invention may be implemented with elements such as transmitters, transceivers, or transponders in place of the satellites (20,22,24,26). It is envisaged that each element may be provided with an omni-directional antennae for transmitting clocking signals over a predetermined range and area. It is further envisaged that the clocking signals may be received from existing transmitters associated with existing cellular communications networks.

It is further envisaged that the user module 32 may be decoupled from a mounting in the car to provide a hand-held unit as is detailed in co-pending UK Patent Application No. 9712070.3. Data from the transceiver 28 is received at antennae 34 and passed to signal processor 36. The signal processor 36 may decompress, decrypt, filter and quantize the signal before it is passed to processor 38. The processor 38 then stores the received data in memory 40. The processor 38 then selects the data relating to generic information about the region 10 and provides the information to audio visual display 42 in the form of a menu.

The user may then selects information of interest from the menu by actuating manual control 44. The processor 38 is responsive to actuation of the manual control 44, and selects data corresponding to a user query entered via actuation of the manual control 44. For example, it is envisaged that a menu be provide which details environmental information relating to facilities within the town or street. Generic information can also be provided so that the user may select a user query for polling the transceiver for information relating thereto.

For example, the menu may provide generic details of stores within a town. A user wishing to select a shoe store will select the menu entry relating to shoe stores, and a user query will be transmitted to the nearest transceiver 28. The transceiver 28 will then request that data relating to the user query be provided from the database stored in control processor 30. Consequently, data relating to the user query will be provided to transceiver 28 which will be transmitted to the user module 32.

Initially, data will be provided which provides geographical information, and detailed information of the individual shoe stores for display in a sub-menu. The user may then select a shoe store from the sub-menu and the user module 32 will again poll the transceiver 28 to request information relating to the selected shoe store and its location within a street.

The processor 26 will then determine the position of the user module 32 as discussed previously, and calculate the position of the selected shoe store in relation to the user module 32. Where the user has selected a shoe store that is not the nearest, the processor must compute a route thereto. The route is computed by first determining the position of the shoe store in relation to the user. For example, if the shoe store is not on the street on which the user is currently situated, the processor firstly computes a route via a byeway.

The processor 38 will then provide directions to the first way-point from the current location of the user module 32. Once the first way-point is reached the process of polling and receiving information relating to the instantaneous environment from the control processor 30 is repeated for determining subsequent way-points.

Within a street having a large area, data may be received from the control processor 30 which is only relevant to the immediately adjacent area. Preferably, the received data/environmental information is in the form of a map of the street.

As the user travels between the way-points the user module 32 continuously receives and updates the position and/or geographical information that is stored in memory and that is provided to audio/video display 42. Preferably the generated display image shows the position of the user in relation to a map of the immediate environment.

It is envisaged that, in use, a user may wish to be provided with a route to a selected destination via one or more intermediate locations. The processor 38 is provided with software for determining a route to the destination via a plurality of way-points, the route being determined according to the preferences entered by the user on manual control 44.

In a preferred embodiment a directional indication to subsequent way-points is provided by the display to direct the user from the initial position via a sequence of intermediate way-points to the destination (i.e. the selected shoe store).

It is envisaged that the user module may be controllable to select the reception of clocking signals for determining the current position thereof from satellites, transceivers, transmitters or transponders associated with a region 10. The region 10 may comprise a large area such a county or state, an area associated with a cellular network, a town or street, or merely a floor of a shopping mall. Similarly, although the invention has been described in terms of the receipt of signals from a GPS system, transceivers, transmitters or transponders associated with a region 10 comprising a cellular network, a town or street, or merely a floor of a shopping mall.

It will further be apparent to those skilled in the art that the invention is capable of application within any building. For example, the invention may be implemented in historical buildings, museums or art galleries for providing a user with information relating to the building and to artefacts or exhibits housed therein. It is further envisaged that the invention may be utilised by the emergency services when entering a unfamiliar region 10 to effect a rescue.

Since the present invention merely requires the provision of a plurality of elements such as transmitters, transceivers or transponders disposed such that a user module 32 located within the region 10 can receive information from at least four of the elements, it will further be apparent to the skilled person that the invention may be implemented over areas such as towns, streets etc.

It is further envisaged that control modules 32 associated with, for example, a building may be linked for data communication with a network of corresponding control modules located in, for example further buildings in a street or area.

It is further envisaged that advertising material, together with other general information may also be downloaded to the user module 32 for provision on the audio/video display 42.

It is yet further envisaged that data may be provided for provision of an audio or video display 42 in a language selected by the user.

It is yet further envisaged that items may be provided with actuable transmitters in order that stolen items can be located and tracked within a predefined region 10.

It is yet further envisaged that children entering the predefined area may be provided with actuable transmitters for locating missing children within the predefined region 10.

Preferably, the display 42 is provided in the form of an LCD or other suitable video display device. However, the display may be provided in the form of classes, goggles or visor having a head-up display capability.

What is claimed is:

1. A navigational system comprising:
    a plurality of transmitters for transmitting a clocking signal to a user mixer module;
    the user module including:
    a processor for computing the range to each of the plurality of transmitters based upon the corresponding clocking signals received therefrom, and for determining a current position relative to each of said plurality of transmitters;
    designation means for sequentially designating and storing a sequence of reference points defining a route from an initial position to a selected final position said route including said current position;
    memory for storing geographical data relating to at least the current position of the user module;
    selection means for selecting geographical data relating to the current location of the user module based upon the determined current position;
    a display for providing an audio or video display of the selected geographical data and the current location of the user module relative thereto, and for providing an indication to the user of the distance and direction to a subsequent reference point in said sequence; and
    transmission means for transmitting said designated sequence of reference points to a control processor associated with at least one of said plurality of transmitters.

2. The system as claimed in claim 1, wherein said designation means is arranged to redefine said sequence of reference points in response to data signals received from said control processor.

3. The system as claimed in claim 2, wherein said designation means is arranged to redefine said sequence of reference points in response to received data signals having a component indicative of current traffic conditions.

4. The system as claimed in claim 1 wherein said designation means is arranged for sequentially designating and storing a sequence of reference points defining a current position relative to an initial position and a selected final position, said reference points being designated at least in part in accordance with said data signals received from said user module.

5. The system as claimed in claim 1 wherein said designation means is arranged for sequentially designating and storing a sequence of reference points defining a current position relative to an initial position and a selected final position, said reference points being designated at least in part in accordance with said data signals received from one or more local transceivers.

6. The system as claimed in claim 1 wherein each of the transmitters are arranged for transmitting data signals over a predetermined range.

7. The system as claimed in claim 1 wherein the signals transmitted by said transmission means comprise a geographical data component and a positional data component.

8. The system as claimed in claim 1 further comprising;
    a transponder for polling at least one of a plurality of transceivers, for receiving geographical data from the transceiver in response thereto, and for storing received geographical data in said memory.

9. The system as claimed in claim 1 further comprising:
    coupling means for coupling said user module to an external device and for receiving geographical data therefrom.

10. The system as claimed in claim 1 further comprising:
    selection means for selecting a route between a current position and a selected position, said means assigning at least a first reference point to said current position and a second reference point to said selected position.

11. The system as claimed in claim 10, wherein the selection means is further arranged for selecting further locations between said current position and said selected position and for assigning reference points to said further locations.

12. A user module for a navigational system comprising:
    a receiver for receiving clocking signals from a plurality of transmitters;
    a processor for computing the range to each of the plurality of transmitters based upon the corresponding clocking signals received therefrom, and for determining a current position relative to each of said plurality of transmitters;

designation means for sequentially designating and storing a sequence of reference points defining a route from an initial position to a selected final position said route including said current position;

a memory for storing geographical data relating to at least the current position of the user module;

selection means for selecting geographical data relating to the current location of the user module based upon the determined current position;

a display for providing an audio or video display of the selected geographical data and the current location of the user module relative thereto, and for providing an indication to the user of the distance and direction to a subsequent reference point in said sequence; and transmission means for transmitting said designated sequence of reference points to a control processor associated with at least one of said plurality of transmitters.

13. The user module as claimed in claim 12, wherein said designation means is arranged to redefine said sequence of reference points in response to data signals received from said transceivers.

14. The user module as claimed in claim 13, wherein said designation means is arranged to redefine said sequence of reference points in response to received data signals having a component indicative of current traffic conditions.

15. The user module as claimed in claim 14, wherein said designation means is arranged to redefine said sequence of reference points in response to received data signals having a component indicative of predicted traffic conditions.

16. The user module as claimed in claim 12 wherein said designation means is arranged for sequentially designating and storing a sequence of reference points defining a current position relative to an initial position and a selected final position, said reference points being designated at least in part in accordance with said data signals received from said user module.

17. The user module as claimed in claim 12 wherein said designation means is arranged for sequentially designating and storing a sequence of reference points defining a current position relative to an initial position and a selected final position, said reference points being designated at least in part in accordance with said data signals received from one or more local transceivers.

18. The user module as claimed in claim 12, wherein the data signals comprise a geographical data component and a positional data component.

19. The user module as claimed in claim 12 further comprising;
a transponder for polling at least one of said plurality of transceivers, for receiving geographical data from the transceiver in response thereto, and for storing received geographical data in said memory.

20. The user module as claimed in claim 12 further comprising;
coupling means for coupling said user module to an external device and for receiving geographical data therefrom.

21. The user module as claimed in claim 12 further comprising;
selection means for selecting a route between a current location and a destination location, said means assigning at least a first reference point to said current location and a second reference point to said destination location.

22. The user module as claimed in claim 21, wherein the selection means is further arranged for selecting further locations between said current location and said destination location and for assigning reference points to said further locations.

23. A method of providing navigational information comprising:
receiving data signals from a plurality of transmitters;
computing the range to each of the plurality of transmitters based upon a clocking signal received therefrom, and for determining a current position relative to each of said plurality of transmitters;
designating a sequence of reference points defining a route from an initial position to a selected final position said route including said current position;
storing geographical data relating to at least the current location in a memory;
selecting geographical data relating to the current location from said memory;
providing an audio or video display of the selected geographical data and the current position of the user relative thereto, and providing an indication to the user of the distance and direction to a subsequent reference point; and
transmitting said designated sequence of reference points to a control processor associated with at least one of said plurality of transmitters.

24. The method as claimed in claim 23 further comprising; disposing the transmitters within a predefined region.

25. The method as claimed in claim 24 wherein the step of disposing the first transmitters comprises providing a plurality of transceivers that are arranged for transmitting data signals over a predetermined range.

26. The method as claimed in claim 25 further comprising;
polling at least one of said plurality of transceivers, receiving geographical data from the transceiver in response there to, and storing received geographical data in said memory.

27. The method as claimed in claim 23 further comprising providing data signals comprising a geographical data component and a positional data component.

28. The method as claimed in claim 23 further comprising;
coupling said user module to an external device and receiving geographical data therefrom.

29. The method as claimed in claim 23 further comprising;
selecting a route between a current location and a destination location; and
assigning at least a first reference point to said current location and a second reference point to said destination location.

30. The method as claimed in claim 23 further comprising; selecting further locations between said current location and said destination location and assigning reference points to said further locations.

31. A navigational system comprising;
a plurality of first transmitters for transmitting a clocking signal to a user module;
the user module including:
a processor computing the range to each of the plurality of transmitters based upon the corresponding clocking signals received therefrom, determining a current position relative to each of said plurality of transmitters, and sequentially designating and storing a sequence of reference points defining a route from an initial position to a selected final position, said route including said current position;

memory storing geographical data relating to at least the current position of the user module;

said processor selecting geographical data relating to the current location of the user module based upon the determined current position;

a display for providing an audio or video display of the selected geographical data and the current location of the user module relative thereto, and for providing an indication to the user of the distance and direction to a subsequent reference point in said sequence; and a second transmitter transmitting said designated sequence of reference points to a control processor associated with at least one of said plurality of first transmitters.

32. The system as claimed in claim 31 wherein said processor is a digital signal processor.

* * * * *